United States Patent [19]

Hahn

[11] 4,086,848

[45] May 2, 1978

[54] DEVICE FOR BREWING INDIVIDUAL CUPS OF COFFEE

[76] Inventor: Harry L. Hahn, 21207 S. Avalon Blvd., Carson, Calif. 90745

[21] Appl. No.: 762,633

[22] Filed: Jan. 26, 1977

[51] Int. Cl.² .................. A47G 19/14; A47J 31/00
[52] U.S. Cl. .................................................. 99/323
[58] Field of Search .......... 99/295, 304, 306, 321–323, 99/316

[56] References Cited

U.S. PATENT DOCUMENTS

| 2,716,937 | 9/1955 | Milano | 99/295 |
| 2,743,664 | 5/1956 | Dale | 99/306 |
| 3,063,359 | 11/1962 | Brant | 99/322 |

Primary Examiner—Leonard D. Christian

[57] ABSTRACT

A receptacle, which is positionable inside a coffee cup, has an encompassing sidewall, an open top and an open bottom; a filter may be releasably coupled to said open bottom for retaining coffee grounds in said receptacle when hot water is poured into said receptacle for brewing coffee in said cup.

4 Claims, 5 Drawing Figures

U.S. Patent  May 2, 1978  4,086,848
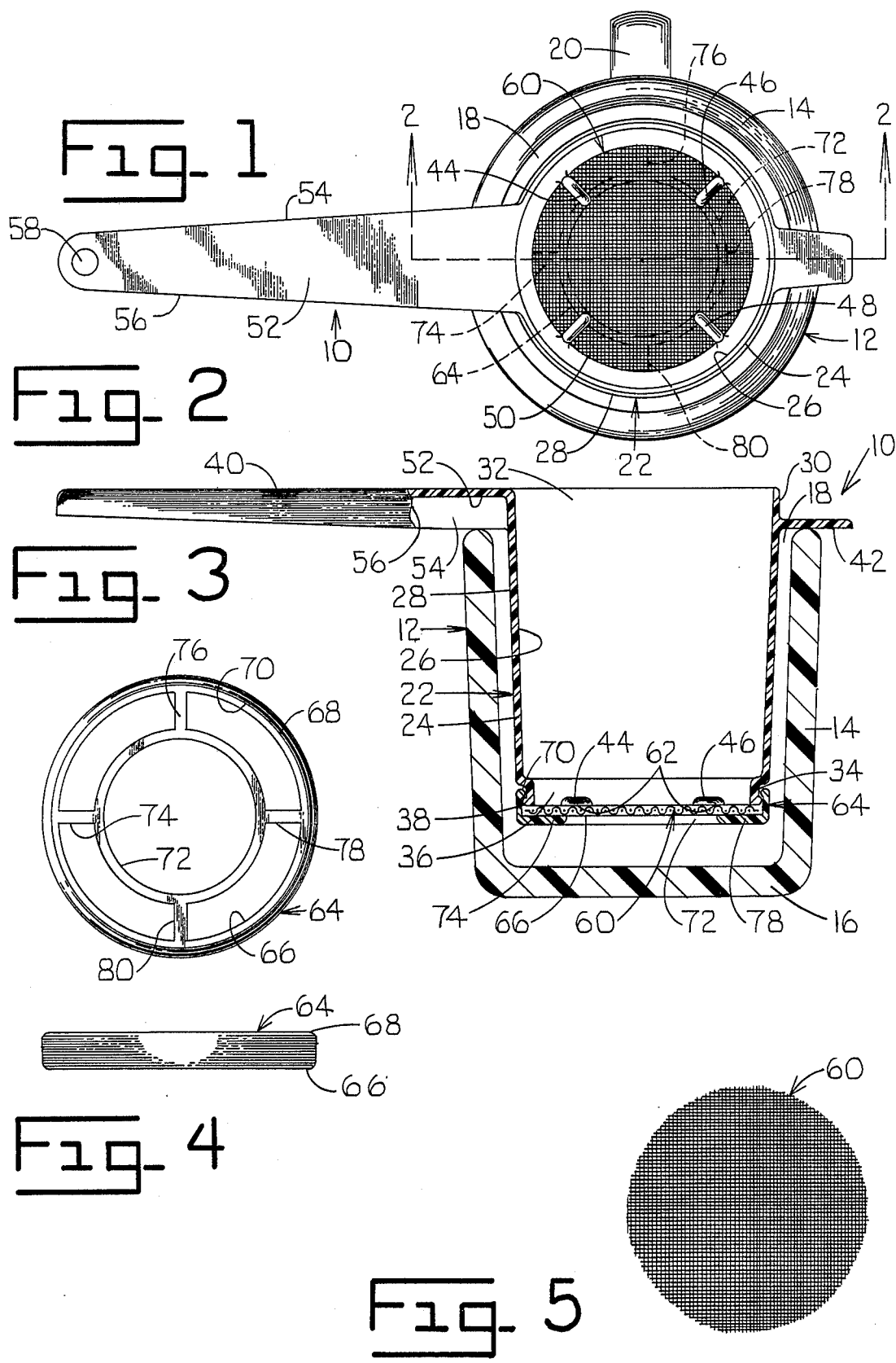

DEVICE FOR BREWING INDIVIDUAL CUPS OF COFFEE

BACKGROUND OF THE INVENTION

The background of the invention will be set forth in two parts.

1. Field of the Invention

The present invention pertains generally to the field of coffee brewers and more particularly to a new and useful device for brewing individual cups of coffee directly in a coffee cup.

2. Description of the Prior Art

Various devices of the type which use paper filters or filtering chambers for making coffee are known. While generally satisfactory, such devices do have certain disadvantages.

Paper filters are expensive, messy and sometimes unavailable. Separate filtering chambers require disassembly for cleaning after every use, filter slowly and are difficult to clean. Additionally, such prior art devices do not lend themselves to brewing individual cups of coffee.

The present invention exemplifies improvements over this prior art.

SUMMARY OF THE INVENTION

It is a primary object of the present invention to provide a new and useful device for brewing individual cups of coffee.

It is another object of the present invention to provide a device of the type described which is not subject to the disadvantages enumerated above.

According to the present invention, a device is provided for brewing coffee in a cup having an encompassing sidewall, a closed bottom and an open top. The device includes a receptacle having an encompassing sidewall, an open bottom and an open top. The receptacle sidewall has a smaller diameter than the cup sidewall so that the receptacle will fit inside the cup.

The device also includes a filter which closes the open bottom of the receptacle. A filter retainer may be provided for coupling the filter to the receptacle in a manner such that the filter may be readily and easily removed for cleaning.

The receptacle may be provided with a handle and an outwardly-extending tab, which may be located 180° from the handle, so that the handle may be used for both manipulating the device and for coacting with the tab in supporting the receptacle in a cup.

Additionally, the receptacle may be provided with an outwardly-extending annular collar at its lower end for engagement by an inwardly-extending collar on the filter retainer so that the filter retainer and its associated filter may be readily and easily coupled to the receptacle.

The features of the present invention which are believed to be novel are set forth with particularity in the appended claims. The present invention, both as to its organization and manner of use, together with further objects and advantages thereof, may best be understood by reference to the following description, taken in connection with the accompanying drawings in which like reference numerals refer to like elements in the several views.

BRIEF DESCRIPTION OF THE DRAWING

FIG. 1 is a plan view showing a device of the present invention in position in a coffee cup;

FIG. 2 is a cross-sectional view taken along line 2—2 of FIG. 1;

FIG. 3 is a plan view of a filter retainer forming part of the device of FIG. 1;

FIG. 4 is a front elevational view of the filter retainer of FIG. 3; and

FIG. 5 is a plan view of a filter forming part of the device of FIG. 1.

DESCRIPTION OF THE PREFERRED EMBODIMENT

Referring again to the drawing, and more particularly to FIGS. 1 and 2, a device for brewing individual cups of coffee constituting a presently-preferred embodiment of the invention, generally designated 10, is shown in position in a coffee cup 12 having an encompassing sidewall 14, a bottom wall 16, an open top 18 and a handle 20.

Device 10 includes a receptacle 22 having an encompassing sidewall 24 of smaller diameter than the sidewall 14 of cup 12 and including an inner surface 26, an outer surface 28, an upper end 30, forming an open top 32, and a reduced-diameter lower end 34, forming an open bottom 36. An outwardly-extending, annular collar 38 is provided on lower end 34, a handle 40 is affixed to upper end 30 180 degrees around sidewall 24 from, and in the same plane as, a tab 42 and four protuberances 44, 46, 48 and 50 are provided on the inner surface of lower end 34 of receptacle 22. Handle 40 may have an inverted U-shaped cross section formed by a bight portion 52 and depending legs 54, 56. An aperture 58 may be provided in handle 40 for hanging device 10 on a suitable hook, or the like.

Referring now to FIGS. 1-5, device 10 also includes a filter 60 which may be positioned in open bottom 36 of receptacle 22 against the lower surface 62 of each protuberance 44, 46, 48, 50. Filter 60 may comprise a screen having a mesh of sufficient fineness to retain coffee grounds (not shown) thereon. Filter 60 may be retained in position in open bottom 36 by a filter retainer 64 having an open bottom 66 and an open top 68. Retainer 64 may be readily and easily coupled to lower end 34 of receptacle 22 by an inwardly-directed annular collar 70 which is provided in open top 68 for engagement with collar 38 on receptacle 22. Retainer 64 includes a ring or circular-shaped member 72 which is affixed to open bottom 66 by four struts 74, 76, 78 and 80.

It will be apparent to those skilled in the art that receptacle 22, filter 60 and retainer 64 may be sold as disassembled parts which may be quickly and easily assembled by the purchaser, thereby saving expensive assembly time at the factory.

Receptacle 22 may be molded as a one-piece unit from suitable non-allergenic material, such as polypropylene or a similar inexpensive polymeric material. Retainer 64 may also be molded as a one-piece unit from such materials.

Filter 60 may be woven from any suitable material, such as nylon, polyethylene, polypropylene or polyester monofilament. Alternatively, filter 60 may be fabricated from stainless steel or the like.

In use, device 10 may be quickly and easily assembled by placing filter 60 in retainer 64 and then snap retainer 64 into position on receptacle 22 coupling collar 70 to collar 38.

Device 10 may then be lowered into cup 12 until handle 40 and tab 42 rest on the brim of cup 12. A measured amount of ground coffee may then be placed in receptacle 22 on filter 60 and boiling water may be poured into receptacle 22 over the coffee until cup 12 is full.

A spoon may then be used to stir the coffee in receptacle 22 which may then be lifted above cup 12 allowing the coffee granules to drain. Device 10 may then be inverted beneath a stream of water to rinse the coffee granules therefrom and clean filter 60, retainer 64 and receptacle 22.

While the particular device for brewing individual cups of coffee herein shown and described in detail is fully capable of attaining the objects and providing the advantages hereinbefore stated, it is to be understood that it is merely illustrative of the presently-preferred embodiment of the invention and that no limitations are intended to the details of construction or design herein shown other than as defined in the appended claims, which form a part of this disclosure.

Whenever the term "means" is employed in these claims, this term is to be interpreted as defining the corresponding structure illustrated and described in this specification or the equivalent of the same.

What is claimed is:

1. A device for brewing coffee in a cup having an encompassing sidewall, a closed bottom and an open top, said device comprising;
   (A) a receptacle including an encompassing sidewall having an inner surface, an open bottom and an open top, said receptacle sidewall being of smaller diameter than said cup sidewall, whereby said receptacle will fit inside said cup, said receptacle having an outwardly-projecting annular collar encompassing said receptacle open bottom;
   (B) a filter closing said receptacle open bottom; and
   (C) a filter retainer releaseably coupled to said receptacle for securing said filter to said receptacle open bottom, said filter retainer including:
      (a) an encompassing sidewall having an inner surface, an open bottom and an open top;
      (b) an inwardly-directed annular collar encompassing said filter-retainer inner surface at said filter-retainer open top for engagement with said outwardly-projecting annular collar, whereby said releaseable coupling is effected;
      (c) a circular-shaped member; and
      (d) a plurality of struts affixing said circular-shaped member in said filter-retainer open bottom for supporting said filter.

2. A device as stated in claim 1 including a plurality of protuberances affixed to said inner surface of said receptacle sidewall adjacent said receptacle open bottom at a position which is slightly above said struts for holding said filter down on said circular-shaped member and said struts.

3. A device as stated in claim 2 wherein said filter is a fine-mesh screen of sufficient fineness to retain coffee grounds.

4. A device as stated in claim 1 including:
   a handle affixed to said receptacle adjacent said receptacle open top; and
   a tab affixed to said receptacle adjacent said receptacle open top in the same plane as said handle and 180° from said handle, said handle and said tab being dimensioned so as to engage said cup sidewall at said cup open top for supporting said receptacle in said cup.

* * * * *